Figure 1:
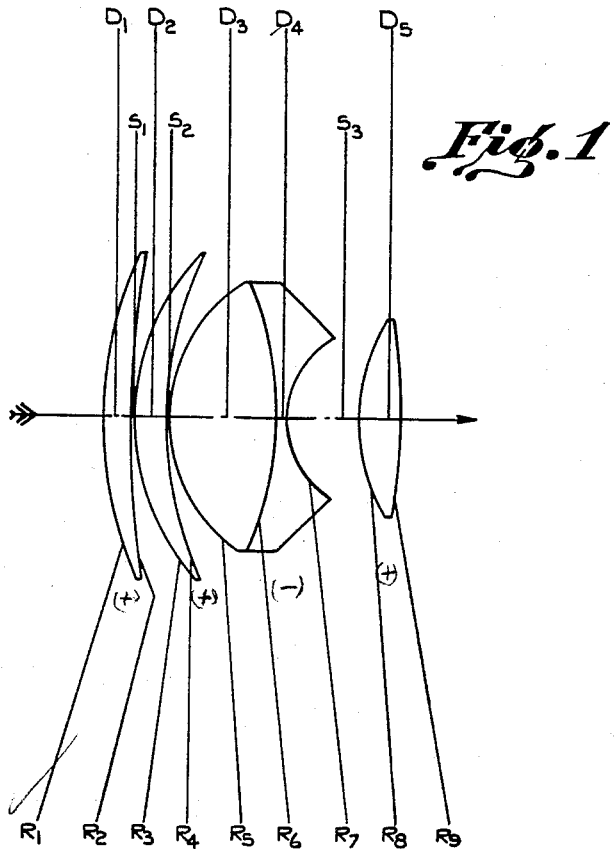

Nov. 23, 1937.     H. W. LEE     2,100,291
LENS
Filed July 18, 1935

INVENTOR.
Horace William Lee
BY Arthur␣␣␣Kent
ATTORNEY

Patented Nov. 23, 1937

2,100,291

UNITED STATES PATENT OFFICE 2,100,291

LENS

Horace William Lee, Leicester, England, assignor to Kapella Limited, Leicester, England, a corporation of England Application July 18, 1935, Serial No. 32,047
In Great Britain July 18, 1934

4 Claims. (Cl. 88—57)

This invention relates to lenses corrected for field curvature of the kind comprising a compound dispersive meniscus member between two collective members of which that on the side of the longer conjugate for which the lens is corrected consists of one or more meniscus components; and its object is to provide such lenses with improved correction for zonal spherical aberration and coma, and thereby to attain larger apertures than hitherto.

In lenses of the kind referred to employing only spherical surfaces, there is inherent zonal spherical aberration of the type in which the outer zone of the lens is over-corrected, while the zone intermediate between the outer zone and the axis is under-corrected. By suitable elaboration of the complexity of the members, for example as described in British patent specification No. 419,552, this zonal aberration can, by the employment of spherical surfaces only, be made of negligible amount in lenses having apertures up to about f/1.2; but in lenses of larger aperture it is not possible, even with such elaboration, to keep the zonal aberration small by the employment of spherical surfaces alone.

I have found by investigation that, by making one, or more, surface of a particular non-spherical shape, the other surfaces being spherical, it is possible to produce substantially zone-free corrections of spherical aberration and coma. Such a surface, or surfaces, may be entirely aspheric, but in such case, if it be concave, its curvature must continuously decrease from the axis toward the lens edge, and vice versa if it be convex. For many purposes I find that the aberrations can be substantially corrected by using a form of surface spherical as to its central portion, and conicoidal as to its marginal portion, the sphere and conicoid osculating at a given zone. When such a surface is concave, the curvature of the conicoid must have a smaller numerical value than that of the sphere near the circle of osculation, and it must continuously decrease (i. e., become flatter with progressively increasing radius) toward the edge of the lens. Where the surface is convex, the curvature of the conicoid must have a greater numerical value than that of the sphere at the circle of osculation, and it must continuously increase toward the lens edge. In effect, therefore, whether the conicoidal margin is applied to a concave or convex surface the result is removal of glass from a lens wholly spherical having throughout the same radius as the center part of the "mixed", part spherical, part conicoidal, surface.

I find that in some cases a surface of this partly spherical, partly conicoidal, type, produces better correction of zonal coma than a surface which is entirely conicoidal, provided that the width of the conicoidal zone is not less than ten per cent of the diameter of the aperture of the surface. Hereafter, in this specification, such an aspheric surface, whether it be entirely or only partially conicoidal, will, unless otherwise distinguished, be termed conicoidal.

While such improved correction can be attained by the use of a conicoidal surface at any part of a system of the kind referred to, I find it to be generally preferable to apply it to that glass-air surface at which the diameter of an axial beam of light incident from infinity within the aperture of the system attains its minimum value, this being the place close to which the diaphragm is placed.

Figure 2:
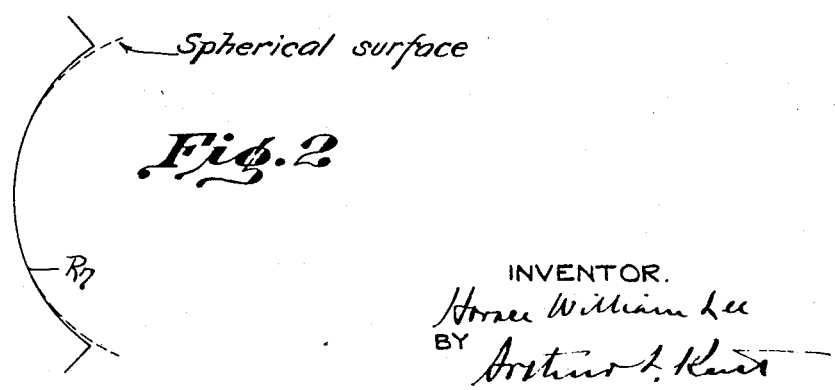

I now give data for the construction of a lens according to my invention, illustrated in the accompanying drawing, wherein Fig. 1 is an axial section through the lens as a whole and Fig. 2 is a detail view on an enlarged scale of the surface $R_7$ showing to an exaggerated degree the deviation of the conicoidal margin from the spherical surface of the center of the lens. The notation is that the successive radii of curvature, counting from the front, are called $R_1$, $R_2$, etc., the sign $+$ denoting that the curve is convex toward the incident light, and $-$ that it is concave toward the same. The axial thicknesses of the elements are denoted by $D_1$, $D_2$, etc., and the separations of the components by $S_1$, $S_2$, etc.

The material is defined in terms of the mean refractive index $^nD$, as conventionally employed, followed by the Abbe V number and by the type number in Messrs. Chance Brothers' optical glass catalogue.

Example

| Aperture f/1 | | Equivalent focal length 1″ | | | |
|---|---|---|---|---|---|
| Radii | Thickness | Separation | $^nD$ | V | No. |
| $R_1=+1.2147$ | $D_1=.0886$ | | 1.6134 | 59.3 | 613593 |
| $R_2=+3.1065$ | | $S_1=0$ | | | |
| $R_3=+.7327$ | $D_2=.084$ | | 1.6134 | 59.3 | 613593 |
| $R_4=+1.1855$ | | $S_2=0$ | | | |
| $R_5=+.5042$ | $D_3=.337$ | | 1.6056 | 60.0 | 606600 |
| $R_6=-1.0516$ | $D_4=.034$ | | 1.6972 | 30.5 | 697305 |
| $R_7=+.2903$ | | $S_3=.2294$ | | | |
| $R_8=+.5939$ | $D_5=.1371$ | | 1.6134 | 59.3 | 613593 |
| $R_9=-1.9062$ | | | | | |

The system made with spherical surfaces is over-corrected for spherical aberration at the margins.

I make the surface 7 spherical to a diameter of 0.392, the full aperture is 0.51 and the outer zone of width 0.059 is a conicoid and osculating the sphere along a circle of diameter 0.392, the section of the conicoidal surface by an axial plane has the equation:—

$$y^2 = .5252\ x - .6361\ x^2 + .00211$$

in which $y$ is measured perpendicular to the axis, and $x$ along the axis away from the vertex of the surface.

Such a surface substantially improves the correction for coma as well as reducing the overcorrection for spherical aberration for the marginal rays.

What is claimed is:

1. A substantially corrected photographic lens comprising in order from the front to the rear a meniscus type collective member with the convex surface towards the incident light, a compound dispersive member including a front collective element and a rear dispersive element and a collective member, said dispersive member having a convex face towards the incident light, and a concave face on the opposite side, all of said members being air-spaced in axial alignment, the power of the collective members being greater than that of the dispersive member to make the lens system as a whole collective, the marginal part of one glass-air surface of one member having a curvature substantially that of one of the conic sections and of a magnitude such that the member having this non-spherical surface contains less glass than it would have if such surface had the same curvature throughout as it had at the axis of the lens to reduce zonal spherical aberration.

2. A lens as in claim 1, in which the surface having a conicoidal marginal part is the concave surface of the compound dispersive member.

3. A lens as in claim 1, in which the surface having a conicoidal marginal part has a central spherical part osculating with such marginal part.

4. A lens as in claim 1, in which the surface having a conicoidal marginal part has a central spherical part, osculating with such marginal part at a zone whose diameter is less than nine-tenths that of the aperture of the surface.

HORACE WILLIAM LEE.